United States Patent Office 2,893,885
Patented July 7, 1959

2,893,885

COMPOSITION COMPRISING ESTERS OF HY-
DROXYLATED POLYBUTADIENE AND PROC-
ESS OF PREPARING SAME

William M. Hutchinson, Bartlesville, Okla., and Howard
W. Bost, Austin, Tex., assignors to Phillips Petroleum
Company, a corporation of Delaware No Drawing. Application April 25, 1952
Serial No. 284,452

25 Claims. (Cl. 106—218)

This invention relates to novel coating compositions. In one of its aspects this invention relates to a process for the production of organic compositions useful as coating compositions and the like. In another of its aspects this invention relates to improving the properties of drying oils.

Coating compositions and synthetic resins have been made in a variety of ways, one of which is to react a polyhydric alcohol, such as glycerol, with a polybasic acid or its anhydride, such as phthalic anhydride, in the presence of various modifying agents. While many of these methods provide useful coating compositions and synthetic resins, superior, more useful and more versatile coating compositions and materials useful in such are continually being sought.

Accordingly it is an object of this invention to provide novel coating compositions and materials useful in such. It is another object of this invention to provide useful and versatile coating compositions. It is still another object of this invention to provide coating compositions having a satisfactory and superior drying rate, water resistance and resistance to accelerated aging. In at least one embodiment of this invention at least one of these objects will be achieved.

We have now discovered compositions useful in coating compositions and which comprise unsaturated fatty acid esters of a hydroxylated conjugated diene polymer. These materials in accordance with one embodiment of this invention are produced by the interaction of a hydroxylated polymerized conjugated diene (homopolymer or copolymer), such as hydroxypolybutadiene, with an unsaturated fatty acid, such as a drying oil acid having from 12 to 24 carbon atoms per molecule. If desired the reaction (esterification) can be carried out in the presence of a drying oil or relatively high boiling inert solvent or diluent as an esterification medium. Generally we have discovered that coating compositions having unusually rapid drying characteristics and other excellent properties, such as hardness and resistance to weathering are produced from hydroxylated polymerized conjugated diene unsaturated fatty acid ester-drying oil compositions.

In one method of preparing the compositions of this invention, a mixture of the drying oil, hydroxylated conjugated diene polymer, and acid is heated at an elevated temperature, generally in the range between 200° and 600° F., sufficient to effect esterification. The acid number of the mixture (mg. KOH/g. sample) is generally not greater than 40 and is preferably less than 30, say around 25. The acid number of the esterified mixture is preferably 15 or less and frequently around 5. It is preferred that 50 to 90 percent of the hydroxyl groups be esterified although, of course, this is dependent to a large extent upon the amount of acid employed. Esterification may be complete by employing a stoichiometric amount of acid. The heating period will usually be in the range from 10 minutes to 24 hours depending upon the materials used and the temperature chosen. It is sometimes desirable to employ an oil-soluble resinous acid, i.e., an acid in the resinous state, along with the unsaturated fatty acid and thereby produce a mixed ester. A preferred method of operation is to add the fatty acid, or a mixture of the fatty acid and resinous acid, to the drying oil or solvent and warm the mixture if necessary to effect solution. The hydroxylated polymer such as hydroxypolybutadiene is then introduced and esterification carried out at the desired temperature. An alternative procedure is to add the hydroxylated polymer to the drying oil and then add the acid. In some cases esterification with the unsaturated fatty acid is effected first and the resinous acid is added later. Heating is then continued to effect further esterification. It is, of course, desirable to agitate the mixture and to operate in an inert atmosphere, such as nitrogen, carbon dioxide, or the like.

The hydroxylated conjugated diene polymer employed in the practice of this invention may be prepared by any suitable method. For example, in accordance with one method, the hydroxypolybutadiene employed for preparing the compositions herein described is prepared from polybutadiene by reaction with hydrogen peroxide or a compound capable of yielding hydrogen peroxide, with or without a solvent, in the presence of a catalyst, e.g., formic acid. The polybutadiene employed can be prepared by either mass or emulsion polymerization and can range from a liquid to a rubber-like material. As indicated polymers of other conjugated dienes such as the conjugated diolefins as well as copolymers of conjugated dienes with copolymerizable materials which can be hydroxylated are also applicable in the preparation of the compositions of this invention. These polymers include butadiene-styrene copolymers as well as other copolymers. The conjugated dienes employed in the manufacture of the hydroxylated polymers employed in our invention preferably contain 4 to 6 carbon atoms and include 1,3-butadiene, isoprene, piperylene, methylpentadiene, 2,3-dimethyl-1,3-butadiene, etc. These dienes may be polymerized alone or with other copolymerizable materials, preferably a vinyl substituted hydrocarbon such as styrene. The polymer, prior to hydroxylation if a liquid, preferably has a viscosity in the range 100–10,000 Saybolt Furol seconds at 100° F., or, if rubber-like, has a ML-4 Mooney value usually in the range 10–100, preferably not greater than 50. Hydroxylated polymers which are especially applicable in this invention have an oxygen content in the range between 1 and 20, preferably between 5 and 15 and especially about 12 percent by weight. The hydroxylation of liquid polybutadiene is more fully described in a copending application of Hillyer and Edmonds, Serial No. 204,062, filed January 2, 1951, now U.S. Patent 2,692,892, the disclosure of which relative to the production of hydroxylated polymers is herewith incorporated and made a part of this disclosure.

Unsaturated (aliphatic) fatty acids which are applicable in the practice of our invention are preferably those containing from 12 to 24 carbon atoms per molecule and include the various drying oil acids such as tung oil acids, oiticica oil acids, linseed oil acids, chia oil acids, safflower oil acids, walnut oil acids, corn oil acids, castor oil acids, tall oil, cottonseed oil acids, perilla oil acids, soybean oil acids, fish oil acids. Typical unsaturated fatty acids include oleic acid, linoleic acid, linolenic acid, dehydrated ricinoleic acid, ricinoleic acid, arachidonic acid, clupandonic acid, palmitoleic acid, eleostearic acid and licanic acid. The quantity of acid employed is usually equivalent to form about 5 to 90 percent of the number of hydroxyl groups in the hydroxylated polymer.

Resinous acids which may be added either alone or as modifiers include rosin acids, such as abietic acid, dehydro-, dihydro-, and tetrahydroabietic acids, disproportionated rosin acids, hydrogenated rosin acids, aromatized rosin acids, and maleic anhydride adducts of rosin acids, d-pimaric acid, l-pimaric acid, tall oil (mixture of oleic and rosin acids), tall oil adduct of maleic anhydride, such as with 3% by wt. maleic anhydride, and the like. These resinous acids can be employed in amounts equivalent to from 0 to 90 percent of the hydroxyl groups in the hydroxylated polymer either in the presence or absence of so-called drying oil.

Drying oils, including the so-called semi-drying oils, which are applicable in the practice of this invention include soybean oil, linseed oil, perilla oil, fish oils, oiticica oil, chia oil, hempseed oil, poppyseed oil, safflower oil, cottonseed oil, tung oil, peanut oil, walnut oil, dehydrated castor oil and the like. These oils are employed in amounts which range from 10 to 95 percent by weight of the total mixture. In instances where the hydroxylated polymer is prepared from a highly viscous or rubber-like polymer, larger amounts of drying oils are generally employed than in cases where the hydroxylated polymer has a relatively low viscosity. Another factor which governs the amount of drying oil used in the production of the compositions of this invention is the degree of hydroxylation of the polymeric starting material. As the degree of hydroxylation is increased, more drying oil is generally required to insure a homogeneous product. Unesterified hydroxylated polybutadiene and other hydroxylated polymers have a tendency to separate from the reaction mixture in the absence of sufficient drying oil and accordingly it is often desirable to employ the chemical equivalent or excess of the acids to the hydroxylated polymer. Usually between about 5 and 50 percent by wt. of the esterification mixture is hydroxylated polymer depending upon the properties of the product desired and whether or not esterification is carried out in the presence of a drying oil or solvent, however, more or less hydroxylated polymer may be used. Also if desired the hydroxylated polymer may be supplemented with a polyhydric alcohol such as a glycol, glycerin, sorbitol, pentaerythritol, etc. For example the hydroxylated polymer/polyhydric alcohol weight ratio may be in the range between 10/1 and about 1/2 depending upon product desired. It is to be understood that the compositions herein described can be prepared from single acids or mixtures of various acids, also from a single or mixture of hydroxylated polymers. Likewise drying oils from a single source or mixtures of drying oils can be employed.

The products of this invention are applicable for the preparation of coating compositions, such as paints and varnishes and the like. Coating compositions in which they are employed have excellent properties, such as unusually rapid drying characteristics, hardness, and resistance to weathering. Some of the lower grade drying oils, e.g., soybean oil and cottonseed oil which are generally not considered applicable in varishes can be employed in relatively large amounts in this invention to give high grade products.

When these compositions are employed in paint and varnish mixtures, the viscosity is generally in the range from Q on the Gardner scale to a point just short of the gel point. The viscosity range of these compositions when they are to be used in paints is generally in the range from Q to Z-4 on the Gardner scale, preferably from S to Z-2, and for varnishes the viscosity is generally in the range from X to just short of the gel point, preferably from Z-1 to Z-4. The viscosity desired in the composition can also be modified by the amount of thinner that is to be employed.

During the preparation of these compositions, that is, during the esterification, some increase in viscosity, or bodying, generally occurs, particularly if elevated temperatures, such as in the higher portion of the range given for esterification, are used. If the product has a viscosity less than that desired for the purpose for which it is to be used, an additional bodying step may be required. This comprises heating the mixture at an elevated temperature in the range between 400° to 650° F. until a product of the desired viscosity is obtained. Usually not more than 10 hours is required. The time required is usually dependent upon the molecular weight of the polymeric starting material and the degree of hydroxylation. Bodying occurs at a more rapid rate in some materials than in others. In general, the higher the molecular weight of the hydroxylated polymer, the less the bodying time required; also the higher the degree of hydroxylation, the less the bodying time required.

It is frequently desirable to incorporate various phenolic resins into paint and varnish compositions to give increased hardness. Materials designated as 100 percent phenolic resins, i.e., a simple condensate of a phenol with an aldehyde, such as p-phenylphenol with formaldehyde, are generally preferred although modified phenolic resins, i.e., phenolic resins modified with rosin acids, are also applicable. When these materials are employed they are usually added to the resinous compositions after esterification and prior to the bodying step.

Subsequent to the bodying step the mixture is cooled and a thinner is added. Conventional thinners for paint and varnish are applicable and include thinners such as mineral spirits or VMP naphtha. In addition, these compositions are also soluble in such hydrocarbon materials as heavy alkylates which have heretofore not been considered applicable for the preparation of paint and varnish compositions. The so-called odorless (paraffinic and isoparaffinic) solvents boiling in a suitable range, prepared by the alkylation of paraffins with olefins using hydrogen fluoride as a catalyst are examples of these materials.

After the thinner has been mixed with the bodied compositions, driers may be added in an effective drying amount. Conventional driers, such as lead, cobalt, zinc, and manganese, in the form of the naphthenate salts, or other suitable form, are usually employed. These materials are added and the mixture warmed to 200 to 250° F. and agitated to improve solution and produce a homogeneous mixture.

As an added feature of this invention we have also provided new compositions comprising mixed, unsaturated fatty acid-polybasic acid esters of these hydroxylated polymers either alone or in drying oils or high boiling solvents. These mixed ester-drying oil compositions are produced by the interaction of hydroxylated polymeric material, such as hydroxypolybutadiene, with an unsaturated fatty acid containing from 12 to 24 carbon atoms per molecule and a polybasic acid, such as unsaturated dibasic acid, or the corresponding anhydride, either simultaneously or in two stages in the presence of a drying oil or relatively high boiling inert solvent or diluent as the esterification medium. It is preferred, however, that the esterification take place in a drying oil medium to avoid subsequent blending of the esters with a drying oil.

In a preferred method of operation unsaturated fatty acid is added to drying oil and the mixture warmed if necessary to effect solution. Hydroxylated polymer is then introduced and esterification carried out at an elevated temperature, such as a temperature in the range between 200 and 600° F., and preferably 300 to 450° F.

The acid number of the mixture (mg. KOH/g. sample), prior to esterification, is generally not greater than 40. Esterification is continued until the acid number drops to about 25 or less. The time required for esterification will usually be in the range from 10 minutes to 24 hours, and more frequently from 30 minutes to 3 hours depending, of course, upon the materials used and the temperature chosen. It is generally preferred that the temperature of the reaction mixture be around 200–300° F. before the polybasic acid or anhydride is added although this is not mandatory. If the first stage in the esterification has been carried out at a high temperature, the mixture is usually cooled prior to addition of the polybasic acid. After the polybasic acid or anhydride is added, esterification is effected at an elevated temperature such as a temperature in the range between 200 and 600° F., preferably 300 to 450° F., the time required for reaction being in the range between 10 minutes and 24 hours and more frequently from 30 minutes to 3 hours. Esterification is continued until the acid number of the resulting product has dropped to 15 and generally lower, around 5 to 10.

An alternative procedure for preparing the esters of this invention is to charge the drying oil, hydroxylated polymer, and both types of acids all at once into a reactor, preferably at room temperature. The mixture is heated gradually until the desired esterification temperature is reached.

Similarly as indicated hereinabove, it is sometimes desirable to employ an oil-soluble resinous acid, i.e., an acid in the resinous state, along with the unsaturated fatty acid and polybasic acid. It is frequently preferred to add the resinous acid along with the unsaturated fatty acid in the first stage of the esterification. In some cases esterification with both the unsaturated fatty acid and the polybasic acid, or anhydride, is effected first and the resinous acid is added later and the heating then continued to effect further esterification.

Polybasic acids suitable in the practice of this invention include the various organic polybasic acids such as the various polybasic acyclic and cyclic acids. These polybasic acids include the polybasic aliphatic acids, polybasic aromatic acids and the polybasic cycloaliphatic acids. Suitable polybasic acids useful in the practice of this invention include the various phthalic acids such as phthalic, isophthalic and terephthalic acid, also adipic acid, azeolaic acid, camphoric acid, citric acid, diglycolic acid, diphenic acid, fumaric acid, glutaric acid, maleic acid, malic acid, malomalic acid, mellitic acid, naphthalic acid, sebacic acid, suberic acid, succinic acid, tartaric acid, pyrotartaric acid. Those organic polybasic acids, which contain between 2 and 20 carbon atoms are especially suitable, phthalic, maleic and fumaric acids being preferred. Anhydrides of these acids are also applicable as well as polybasic acid-like materials such as the condensation product of maleic anhydride with rosin acids. The amount of polybasic acid or anhydride employed is that equivalent to from 1 to 20 percent, preferably 5 to 13 percent, of the hydroxyl groups in the hydroxylated polymer, preferably not more than 4 percent by wt. of the esterification mixture. The amount of unsaturated fatty acid used therewith is determined, at least in part, by the amount of polybasic acid or anhydride employed. If it is assumed that the polybasic acid will react with a certain number of hydroxyl groups, then the quantity of unsaturated fatty acid employed is that which is equivalent to at least from 1 to 90 percent of the remaining hydroxyl groups in the hydroxypolybutadiene.

It is to be understood that the compositions herein described can be prepared from a single polybasic acid or its anhydride, or mixtures thereof. If desired various pigments can be added especially in paint formulations prepared from these compositions. Suitable pigments include litharge, white lead, ZnO, titanium oxide, iron oxide, etc.

The following examples are illustrative of the invention only and are not to be considered as limitive thereof.

Example I

A sample of liquid polybutadiene, prepared by sodium catalyzed polymerization, having a viscosity of 460 Saybolt Furol seconds at 100° F., and a Gardner color of 15, was hydroxylated with 10 percent aqueous hydrogen peroxide in the presence of formic acid in the ratio of one $C_4$ equivalent of polybutadiene per mol of hydrogen peroxide per mol of formic acid. The product had an oxygen content of 10.3 percent by weight. This sample is hereinafter designated as A.

A second sample of liquid polybutadiene, prepared as described above, was hydroxylated using chloroform as a solvent with 20 percent aqueous hydrogen peroxide in the presence of formic acid in the ratio of two $C_4$ equivalents of polybutadiene per mol of hydrogen peroxide per mol of formic acid. The product had an oxygen content of 19.3 percent by weight. This sample is hereinafter designated as B.

The two hydroxylated polybutadiene materials were employed for the preparation of a series of resinous compositions using different unsaturated fatty acids and drying oils. A mixture of the drying oil, unsaturated fatty acid, and hydroxypolybutadiene was heated to a temperature of 350 to 400° F. and held at that level until the acid number decreased to 15 or less (milligrams KOH per gram sample). The resulting resinous compositions were employed for the preparation of varnishes as hereinafter described. They were bodied by heating at 550–625° F. until a string about 1.5 inches long could be drawn from a drop of the product cooled to near room temperature. While the bodied compositions were cooling they were thinned with mineral spirits and driers of lead and cobalt, in the form of their naphthenate salts, were then added by warming the mixtures to 200–250° F. and mixing thoroughly. The lead drier contained 24 percent lead and the cobalt drier contained 6 percent cobalt. The amount of each drier employed was such that each varnish sample contained 0.2 percent lead and 0.05 percent percent cobalt (based on the resinous composition without thinner). The total composition contained from 33 to 50 percent thinner.

In one instance a 100 percent phenolic resin was added with the application of heat after the esterification step was completed but prior to the bodying step. This resin was a condensation product of p-phenylphenol and formaldehyde (ST–137–X). In two other cases modified phenolic resins were employed.

Various tests were made using the different varnish samples prepared as described above.

1. *Drying time.*—Test panels 1¾ in. wide by 4 in. long, made of 31 gage tin plate were washed thoroughly with benzene immediately prior to being coated. Application of the coating was made by pouring the composition over the test panel and allowing the excess coating to drain off by supporting the panel in a nearly vertical position. The tests were carried out in an air conditioned room at a controlled temperature away from direct rays of the sun.

Two stages of drying were recorded for each film by testing the film about an inch below the upper edge of the drained films (a) tack free, which is the time required for the film to dry to a condition where no coating will adhere to the finger when touched lightly; (b) rub dry, which is the time required for the film to dry to a condition where nothing more than an easily removed finger print results when the film is subjected to a moderate rubbing pressure.

2. *Sward hardness.*—The hardness value is taken as the Sward rocker reading of the film at the end of the initial 24-hour drying period (reading on glass equal to 100 oscillations).

3. *Water resistance.*—Panels were prepared as described above and allowed to dry for 48 hours. The upper end of the drained films were then immersed in distilled water for 18 hours at room temperature. The panels were removed from the water, wiped carefully, and allowed to dry at room temperature. The time required for whitening to disappear was noted.

4. *Accelerated weathering.*—Panels for this test were prepared by applying three coats of varnish with a small brush to edge-cut, sanded, white pine panels 2⅝ in. wide, 7 in. long, and ¼ in. thick. During the two-day drying periods between coating applications the panels were allowed to drain vertically. Just prior to the application of the third coating the panels were sanded lightly. A seven-day drying period was allowed between the application of the final coating and the beginning of the accelerated weathering tests.

The accelerated weathering tests were carried out in an Atlas, twin arc, alternating current weatherometer. The black panel temperature varied from 140 to 160° F. The panels were rotated about the arcs for 17 minutes without spray and three minutes with a spray of tap water directly on them.

Two evaluations were made on the results of the accelerated weathering test. The first was the general resistance in terms of the degree of protection still afforded by the coating. The second was in terms of the general appearance of the coating remaining, including gloss and clarity of composition.

Four controls were run using samples of commerical varnishes. The following results were obtained:

aqueous hydrogen peroxide in the presence of formic acid in the ratio of three $C_4$ equivalents of polybutadiene per mol of hydrogen peroxide per 0.5 mol formic acid. The ratio of chloroform to polybutadiene, in parts by weight, was 8:1. The product had an oxygen content of approximately 12 percent by weight. This sample is hereinafter designated as C.

The hydroxypolybutadiene samples designated as B (Example I) and C were employed for the preparation of a series of resinous compositions using linseed oil acids and either linseed oil or soybean oil for the esterification medium. The procedure given in Example I was employed. Varnishes were prepared from the resinous compositions using mineral spirits as a thinner in a quantity such that the thinner comprised approximately 50 percent of the total composition. Cobalt and manganese driers, in the form of naphthenates, were used. The cobalt salt is described in Example I. The manganese drier contained 6 percent manganese. The amount of each drier employed was such that each varnish sample contained 0.08 percent cobalt and 0.02 percent manganese (based on the resinous composition without thinner).

A sample of hydroxylated butadiene-styrene copolymer was prepared from a sodium-catalyzed, liquid copolymer of butadiene-styrene (70:30). This hydroxylated copolymer was then esterified with linseed acids in linseed oil at a temperature in the range 300–400° F. until the acid number reached 15 mg. KOH per gram or less. Sufficient bodying was obtained at the esterification temperature so that no increase in the temperature was used

| Sample No. | Hydroxy-polybutadiene | | Wt. Percent Non-Volatiles [a] | | | | | | Drying Time, Hrs. | | Sward Hardness in 24 Hrs. | Water Resistance | | Accelerated Weathering | |
|---|---|---|---|---|---|---|---|---|---|---|---|---|---|---|---|
| | | | Acid | | Other | | Drying Oil | | | | | | | | |
| | Sample | Parts | Type | Parts | Phenolic Resin | Parts | Type | Parts | Tack Free | Rub Dry | | Resistance to Attack [b] | Hrs. to Loss of Whitening | General Resistance [b] | General Appearance [b] |
| 1 | A [c] | 25 | Linseed | 25 | | | Linseed | 50 | 1.5 | 3 | 6 | | | 6+ | 0 |
| 2 | B [d] | 14 | do | 26 | Modified [e] | 20 | do | 40 | 1.5 | 3 | 25 | 9 | 2 | 2 | 1+ |
| 3 | B | 14 | do | 26 | Modified [f] | 20 | do | 40 | 1 | 3 | 25 | 9 | 2 | 1 | 1 |
| 4 | B | 12 | do | 21 | 100% [g] | 34 | do | 33 | 2.25 | 4.5 | 14 | 9 | 0.3 | 7 | 7 |
| 5 | B | 17 | do | 32 | | | Soybean | 51 | 1 | 5 | 2 | 6 | 2 | 9 | 10 |
| 6 | A | 26 | Tall Oil | 25 | | | do | 49 | 1.75 | 3 | 16 | 6 | | | |

CONTROLS

| | | | | | | | | | | | | | | | |
|---|---|---|---|---|---|---|---|---|---|---|---|---|---|---|---|
| Commercial Varnish: | | | | | | | | | | | | | | | |
| du Pont Super Clear | | | | | | | | | 2.25 | 3.5 | 28 | 9 | 2 | 3 | 3 |
| du Pont Supremis Floor | | | | | | | | | 2.25 | 4.5 | 15 | 9 | 2 | 3+ | 4 |
| du Pont Dulux Spar | | | | | | | | | 3.5 | 4.5 | 8 | 10 | 2 | 10 | 9+ |
| Cook's Clear Floor | | | | | | | | | 1.75 | 3.25 | 36 | 9 | 2 | 2 | 3 |

[a] All mixtures thinned (or soluble) in mineral spirits.
[b] Arbitrary scale from 0 to 10, 10 indicating unaffected.
[c] Hydroxypolybutadiene, oxygen content 10.3 percent.
[d] Hydroxypolybutadiene, oxygen content 19.8 percent.
[e] Arochem 90.
[f] Arochem 335.
[g] St-137-X.

Arochem 90 is an estergum modified phenolic resin obtained from United States Industrial Chemical Company, a division of National Distillers Products Company. It has infinite compatibility with mineral spirits; specific gravity 1.07–1.12; acid number 10–15; softening point 130–140 C., ball and ring method; Gardner color 11 (50 percent solution).

Arochem 335, also a product of U.S.I., is an estergum modified phenolic resin. It has limited mineral spirits tolerance; a specific gravity of 1.09–1.14; an acid number of 12–18; a softening point of 148–158 C. (ball and ring method); Gardner color 12 (50 percent solution).

Amberol SI-137X is a pure phenolic resin obtained from Resinous Products Company. It is non-heat-hardening, compatible with aliphatic solvents; has a specific gravity of 1.04; acid number less than 40; a softening point of 85–110 C. (ball and ring method).

Samples 1, 2, 3 and 6 show shorter drying times than any of the controls. Sample 5 demonstrates the excellent quality varnish that can be obtained using soybean oil. It is equivalent in accelerated weathering to du Pont Dulux Spar varnish which gave the best showing of any of the controls.

*Example II*

A sample of liquid polybutadiene described in Example I was hydroxylated in chloroform with 26.5 percent for bodying. The resulting product was thinned with a mixture of xylene and n-butanol to yield about 50% solids. The amount of driers employed therewith was 0.08 percent Co and 0.02 percent Mn as naphthenates. This composition is hereinafter designated as D.

Also, a sample of 22 Mooney 80° F. polybutadiene rubber was hydroxylated in a chloroform solution with 20 percent aqueous hydrogen peroxide and formic acid. The resulting emulsion was added slowly to a mixture of linseed oil and linseed acid which was held at 150–

300° F. At this temperature the chloroform, formic acid, and water were boiled off rapidly and the esterification of the hydroxylated rubber was begun. After addition of the hydroxylated rubber was complete the temperature was increased and held at 400–450° F. for 1½ hrs. The mixture became very viscous but there was no evidence of gelation and the product was completely compatible with mineral spirits and with toluene. The resulting product was thinned and driers added similarly as set forth immediately above. This composition is hereinafter designated as E.

Varnish tests for drying time, Sward hardness, and water resistance were made as described in Example I. Two runs were made using commercial pentaerythritol (Pentek) instead of hydroxypolybutadiene for the preparation of the resinous compositions. The varnishes prepared from hydroxypolybutadiene, B and C, all dried in a shorter time than those prepared from pentaerythritol. The results were as follows; all parts being parts by weight:

maining 89 parts of the above mixture was added another 1.2 parts of phthalic anhydride and the temperature was held at 340–360° F. for 2.5 hours when the acid number was 5 milligrams KOH per gram sample. From this mixture was removed 11 parts for preparation and testing as a varnish (hereinafter designated as composition 2). To the remaining 79 parts of the above mixture was added another 1.2 parts of phthalic anhydride. After heating 45 minutes at 350° F. the acid number was 10 milligrams KOH per gram sample. From this mixture was removed 11 parts for preparation and testing as a varnish and designated as composition 3.

A fourth resinous composition was prepared by charging 36 parts of the hydroxypolybutadiene described above, 27 parts linseed oil acids, and 33 parts linseed oil to the reactor, heating the mixture rapidly to 300° F. and holding it at that temperature under an atmosphere of carbon dioxide for 12 hours. The mixture was agitated during this period. After this time the acid number was 18 milligrams KOH per gram sample. Phthalic

| Sample No. | Polyhydroxy Material Type | Polyhydroxy Material Parts | Linseed Acids, Parts | Drying Oil Type | Drying Oil Parts | Esterification Time at 450° F., Hrs.:Min. | Bodying Time, 580–600° F., Hrs.:Min. | Gardner Viscosity | Drying Time Tack Free, Hrs.:Min. | Drying Time Rub Dry, Hrs.:Min. | Sward Hardness in 24 Hrs. | Water Resistance Resistance to Attack | Water Resistance Hours to Loss of Whitening |
|---|---|---|---|---|---|---|---|---|---|---|---|---|---|
| 1 | B | 17.3 | 32.7 | Linseed | 50 | 6:30 | 0:30 | Z-4 | 1:30 | 2:10 | 5 | 2 | 8 |
| 2 | B | 17.3 | 32.7 | Soybean | 50 | 6:30 | 0:40 | Z-4 | 2:10 | 2:45 | 4-5 | 4 | 7 |
| 3 | Pentek | 5.9 | 44.1 | Linseed | 50 | 9ª | 2:10 | Z-3 | 2:45 | 4:00 | 4-5 | 4 | 7 |
| 4 | do | 5.9 | 44.1 | Soybean | 50 | 7 | 2:25 | Z-3 | 2:45 | 5:00 | 5 | 4 | 7 |
| 5 | C | 16 | 11 | Linseed | 73 | 6:30 | 1:05 | Z-4 | 2:00 | 2:45 | 5 | 2 | 8 |
| 6 | C | 16 | 11 | {Linseed, Soybean} | {23, 50} | 6:30 | 1:45 | Z-4 | 2:00 | 3:30 | 5 | 4 | 6 |
| 7 | C | 45 | 30 | Linseed | 25 | 1:10ª | 0:00 | Z-4 | 1:50 | 2:15 | 7 | 4 | 7+ |
| 8 | D | 32 | 18 | do | 50 | 5ª | 0:8 | | 2:0 | 2:30 | | | |
| 9 | E | 15 | 10 | do | 75 | 1:30ᵇ | 0:0 | | 2:0 | 2:30 | | | |

ª 350–400° F.
ᵇ 150–300° F.

*Example III*

A sample of liquid polybutadiene, prepared by sodium catalyzed polymerization and having a viscosity of 488 Saybolt Furol seconds at 100° F. and a Gardner color of 10 was hydroxylated in the presence of chloroform as a solvent with 20 percent aqueous hydrogen peroxide in the presence of formic acid in the ratio of three $C_4$ equivalents of polybutadiene per mol of anhydrous hydrogen peroxide per mol of formic acid. The product had an oxygen content of 12 percent by weight.

The hydroxypolybutadiene was employed for the preparation of four different resinous compositions using linseed oil acids, linseed oil, and phthalic anhydride. A mixture of 38 parts of the hydroxypolybutadiene, 11 parts linseed oil acids, and 50 parts linseed oil was heated to 350° F. within 40 minutes while carbon dioxide gas was passed through the reactor. The mixture was agitated throughout the reaction. The temperature was held at about 400° F. for 3 hours after which the acid number was 14 milligrams KOH per gram sample. Heating was continued for another 1.5 hours when the charge was cooled to 300° F. and 1.2 parts of phthalic anhydride was added. The temperature was then raised to 400° F. and held there for 3 hours. After this time the acid number was 8 milligrams KOH per gram sample. Eleven parts of the composition was removed for preparation and testing as a varnish, as more fully described hereinafter. Sufficient bodying was obtained at the esterification temperature that no further heating at an increased temperature was considered necessary. This composition is hereinafter designated as composition 1. To the reanhydride (3.6 parts) was added to the mixture (at 300° F.) and the temperature was held at this level until the acid number was 15 milligrams KOH per gram sample. This product is hereinafter designated as composition 4.

Each of the resinous compositions prepared as described above was thinned with a mixture containing equal parts of xylene and n-butanol until the final mixture contained about 50 percent of the resinous composition. Driers of cobalt and manganese, in the form of their naphthenate salts, were added by warming the mixture to 200–250° F. and agitating to obtain a homogeneous product. The amount of each drier was such that each varnish sample contained 0.08 percent cobalt and 0.02 percent manganese (based on the resinous composition without thinner).

Four runs were made for comparative purposes, two of them using samples of commercial varnish, one (composition 5) using only linseed oil, and one (composition 6) using hydroxypolybutadiene esterified with linseed oil acids in the presence of linseed oil. In this latter case the starting material was liquid polybutadiene, prepared by sodium catalyzed polymerization of butadiene, having a viscosity of 460 Saybolt Furol seconds at 100° F. and a Gardner color of 15. This product was hydroxylated in chloroform with 20 percent aqueous hydrogen peroxide in the presence of formic acid in a ratio of two $C_4$ equivalents of polybutadiene per mol of hydrogen peroxide per mol of formic acid. The product had an oxygen content of 19.3 percent. Esterification was effected as described in Example I.

Various tests were made using the different varnish samples prepared as described hereinabove. The following results were obtained:

|  | Composition | | | | | | Commercial Varnish [2] | |
|---|---|---|---|---|---|---|---|---|
|  | 1 | 2 | 3 | 4 | 5 | 6 | 7 | 8 |
| Hydroxypolybutadiene, wt., Percent | 38 | 37 | 37 | 36 | ----- | 17 | ----- | ----- |
| Linseed oil acids, wt., Percent | 11 | 11 | 11 | 27 | ----- | 33 | ----- | ----- |
| Phthalic anhydride, wt., Percent | 1.2 | 2.6 | 4.3 | 3.6 | ----- | ----- | ----- | ----- |
| Linseed oil, wt., Percent | 50 | 49 | 48 | 33 | 100 | 50 | ----- | ----- |
| Drying time, hours: | | | | | | | | |
| Tack free | 2.3 | 2.3 | 2.5 | 1.3 | 1.8 | 1.5 | 3.5 | 2.3 |
| Rub dry | 2.7 | 2.7 | 2.8 | 2.3 | 5.5 | 2.2 | 4.5 | 4.5 |
| Sward hardness | 6 | 6 | 6 | 6 | 5 | 5 | 8 | 15 |
| Water resistance: | | | | | | | | |
| Rating [1] | 4 | 5 | 9 | 9 | 6 | 8 | 10 | 9 |
| White loss, hours | 4 | 2 | 2 | 2 | 4 | 2 | 2 | 2 |
| Accelerated weathering [1] | 9 | 10 | 9 | 10 | 6 | 8 | 10 | 3 |

[1] Arbitrary scale from 0 to 10, 10 indicating unaffected.
[2] Composition 7: du Pont Dulux Spar Varnish; Composition 8: du Pont Supremis Floor Varnish.

Varnishes prepared from compositions 1, 2, 3 and 4 have very rapid drying times and good water resistance and accelerated weathering characteristics. They dry much more rapidly than the commercial varnishes tested or the linseed oil and are harder and have better accelerated weathering characteristics than the resinous compositions prepared in a samilar manner except that no phthalic anhydride was used.

*Example IV*

Drying oil soluble esters of an unsaturated fatty acid an a hydroxylated polymerized conjugated diene have also been prepared in the absence of a drying oil or an added solvent or diluent as the esterification medium, likewise mixed or co-esters of unsaturated fatty acids, such as drying oil acids, and organic polybasic carboxylic acids or anhydrides with an hydroxylated polymerized diene have also been prepared.

In one experiment a mixture comprising hydroxylated polybutadiene (12.5 percent by wt. oxygen), linseed acids and phthalic anhydride, in the parts by weight 45.0, 52.9 and 2.0, respectively, were reacted at 300° F. for 2 hrs. under an inert $CO_2$ atmosphere. The esterified reaction product had a low acid number and a desirable color and was compatible with linseed oil in a 37–70 wt. ratio when bodied at an elevated temperature (550° F.)

*Example V*

Liquid polybutadiene having a viscosity of 488 Saybolt Furol seconds at 100° F. and a Gardner color of 10 was hydroxylated in chloroform with 20 percent aqueous hydrogen peroxide in the presence of formic acid. The ratio of these reactants was three $C_4$ equivalents of the liquid polybutadiene per mol of anhydrous hydrogen peroxide per mol of formic acid. The resulting hydroxylated polybutadiene had an oxygen content of 12 percent by weight. A mixture comprising 40 percent by wt. of the above-identified hydroxylated polybutadiene and 60 percent by wt. linseed acids was charged to a reactor which had been flushed with $CO_2$. The mixture was agitated and heated in an inert $CO_2$ atmosphere at a temperature of 300° F. for 2 hrs. The resulting esterified product had an acid number of 91, a Hellige color of 14 and a Gardner viscosity of V.

*Example VI*

A mixture comprising 40 percent by wt. hydroxylated polybutadiene (the same as in Example V) and 60 percent by wt. linseed acids was heated in an inert $CO_2$ atmosphere at a temperature of 300° F. for 7.5 hrs. The resulting esterified product had an acid number of 72, a Hellige color of 16 and a Gardner viscosity of Z-2.

*Example VII*

A mixture comprising 37 percent by wt. polybutadiene (the same as in Example V) and 63 percent by wt. linseed acids was heated in an inert $CO_2$ atmosphere at a temperature of 300° F. for 2 hrs. The resulting esterified product had an acid number of 95, a Hellige color of 13 and a Gardner viscosity of T.

Also a mixture comprising 70 parts by wt. linseed oil to 30 parts by wt. of the above resulting esterified product was heated to a temperature of 575° F. After about 70 minutes at this temperature the mixture had an acid number of 8.6 and after about 3 hrs. (180 minutes) the varnish formulation (mixture) had an acid number of 6.

*Example VIII*

A mixture comprising 62 percent by wt. hydroxylated polybutadiene (the same as in Example V) and 37.5 percent by wt. linseed acids was heated in an inert $CO_2$ atmosphere at a temperature of 300° F. for 2 hrs. The resulting esterified product had an acid number of 49. The mixture was then heated at a temperature of 350° F. for 2 hrs. This esterified product was a dark red, viscous liquid and had an acid number of 27. Upon again heating the mixture to a temperature of 400° F. for 2 hrs. a rubber-like material having an acid number of 15 was obtained.

*Example IX*

A mixture comprising 34 parts by wt. hydroxylated polybutadiene (the same as in Example V), 40 parts by wt. linseed acids and 4 parts by wt. phthalic anhydride was heated in an inert $CO_2$ atmosphere at a temperature of 300° F. for 2 hrs. An amount of linseed oil, 172 parts by wt., was then added to the esterified product and heated in an inert $CO_2$ atmosphere at a temperature of 550° F. for 2 hrs. At the end of this heating period approximately 62.5 percent of the added phthalic anhydride remained unreacted. The final product had an acid number of 13, a Hellige color of 11 and a Gardner viscosity of T.

As indicated hereinbefore the compositions prepared according to this invention generally comprise 5 to 95% by weight drying oil, preferably in the range 25 to 75% by weight and 5 to 95% by weight hydroxylated polybutadiene ester, preferably in the range 25 to 75% by weight. It is also preferred that hydroxylated polybutadiene-organic polybasic acid ester content of the compositions does not comprise more than 15% by weight when calculated as the unmixed ester. All the percents by weight are based on the normally non-volatile constituents of these compositions, excluding added driers and pigments, if any, since these materials may be added in varying amount. It is also pointed out that if resins, such as phenolic and modified phenolic resins, are added to the compositions of this invention they are usually added in an amount in the range 5 to 50% by weight, preferably in the range 15 to 35% by weight.

As will be evident to those skilled in the art upon reading this disclosure, many modifications, variations and substitutions are possible without departing from the spirit or scope of this invention.

We claim:

1. A composition comprising linseed oil and an ester of a polymer of butadiene which has been hydroxylated and linseed oil acid.

2. A method of preparing a material useful in coating compositions which comprises esterifying a homopolymer of butadiene which has been hydroxylated with an unsaturated fatty acid containing from 12 to 24 carbon atoms per molecule.

3. A method according to claim 2 wherein the esterification is effected in the presence of a high-boiling inert solvent.

4. A composition comprising an ester of a homopolymer of butadiene which has been hydroxylated and an acid selected from a group consisting of unsaturated fatty acids and resinous acids.

5. A composition comprising a glyceride drying oil and an ester of a polymer of butadiene which has been hydroxylated and an unsaturated drying oil acid.

6. The composition of claim 5 wherein said drying oil acid is an unsaturated fatty acid containing 12 to 24 carbon atoms per molecule.

7. The composition of claim 6 including an organic polycarboxylic acid.

8. A composition comprising an ester of a homopolymer of butadiene which has been hydroxylated and a resinous acid.

9. A composition comprising an ester of a homopolymer of butadiene which has been hydroxylated and tall oil.

10. A composition comprising an ester of a homopolymer of butadiene which has been hydroxylated and an abietic acid.

11. A composition comprising an ester of a polymer of butadiene which has been hydroxylated and a drying oil acid, and soy oil.

12. A composition comprising a glyceride drying oil and an ester of a polymer of butadiene which has been hydroxylated and an unsaturated fatty acid containing from 12–24 carbon atoms per molecule and an organic dibasic acid-acting material selected from the group consisting of phthalic acid, maleic acid, fumaric acid, and their anhydrides.

13. A composition comprising linseed oil and an ester of a polymer of butadiene which has been hydroxylated and linseed oil acids and phthalic anhydride.

14. A method of preparing a material useful in coating compositions which comprises esterifying a homopolymer of butadiene which has been hydroxylated with an unsaturated drying oil acid and an organic polycarboxylic acid in the presence of relatively high-boiling inert solvent.

15. A method according to claim 14 wherein the drying oil acid is an unsaturated fatty acid containing from 12 to 24 carbon atoms per molecule.

16. A method according to claim 14 wherein the organic polycarboxylic acid is a dibasic acid-acting material selected from the group consisting of phthalic acid, maleic acid, fumaric acid, and their anhydrides.

17. A method of preparing a material useful in coating compositions which comprises esterifying a polymer of butadiene which has been hydroxylated with an unsaturated drying oil acid and a dibasic acid-acting material selected from the group consisting of phthalic acid, maleic acid, fumaric acid, and their anhydrides, in the presence of a glyceride drying oil.

18. A method of preparing a material useful as a coating composition which comprises esterifying a polymer of butadiene which has been hydroxylated with an unsaturated fatty acid containing from 12 to 24 carbon atoms per molecule and incorporating the resulting esterified product into a glyceride drying oil.

19. A method of preparing a material useful in coating compositions which comprises esterifying a homopolymer of butadiene which has been hydroxylated with a resinous acid.

20. A method of preparing a material useful in coating compositions which comprises esterifying a homopolymer of butadiene which has been hydroxylated with an acid selected from a group consisting of unsaturated fatty acids and resinous acids containing from 16 to 30 carbon atoms.

21. A composition comprising a glyceride drying oil and an ester of a homopolymer of butadiene which has been hydroxylated and an unsaturated drying oil acid.

22. A composition comprising an ester of a homopolymer of butadiene which has been hydroxylated and an unsaturated drying oil acid.

23. A method of preparing a material useful in coating compositions which comprises esterifying a homopolymer of butadiene which has been hydroxylated with an unsaturated drying oil acid.

24. A composition comprising an ester of a polymer of butadiene which has been hydroxylated and an acid selected from the group consisting of unsaturated fatty acids and resinous acids, and a glyceride drying oil.

25. A method of preparing a material useful in coating compositions which comprises esterifying, in the presence of a glyceride drying oil, a polymer of butadiene which has been hydroxylated with an unsaturated fatty acid containing from 12 to 24 carbon atoms per molecule.

References Cited in the file of this patent

UNITED STATES PATENTS

| | | |
|---|---|---|
| 1,963,108 | Werntz | June 19, 1934 |
| 2,609,358 | Pfann et al. | Sept. 2, 1952 |
| 2,634,256 | Sparks et al. | Apr. 7, 1953 |

UNITED STATES PATENT OFFICE

CERTIFICATE OF CORRECTION

Patent No. 2,893,885                                                      July 7, 1959

William M. Hutchinson et al.

It is hereby certified that error appears in the printed specification of the above numbered patent requiring correction and that the said Letters Patent should read as corrected below.

Column 3, line 9, for "form" read -- from --; column 6, line 42, strike out "percent", second occurrence; column 11, line 44, for "37-70 wt." read -- 30-70 wt. --.

Signed and sealed this 9th day of February 1960.

(SEAL)
Attest:
KARL H. AXLINE

Attesting Officer

ROBERT C. WATSON
Commissioner of Patents